United States Patent [19]

Rawlings et al.

[11] Patent Number: 4,517,139
[45] Date of Patent: May 14, 1985

[54] DEVICE AND METHOD FOR CENTRIFUGALLY CASTING ARTICLES ON A CONTINUOUS BASIS

[75] Inventors: David L. Rawlings, Bayville; Robert E. Glick, Centerport, both of N.Y.

[73] Assignee: International Hydron Corporation, New York, N.Y.

[21] Appl. No.: 490,642

[22] Filed: May 2, 1983

[51] Int. Cl.³ .............................................. B29D 11/00
[52] U.S. Cl. ....................................... 264/2.1; 65/302; 264/1.1; 264/297.8; 264/311; 425/259; 425/261; 425/434; 425/808
[58] Field of Search ................. 264/310, 311, 2.1, 1.1, 264/297; 65/71, 302; 425/808, 21, 434, 259, 261; 432/125

[56] References Cited

U.S. PATENT DOCUMENTS 3,107,141 10/1963 Crafton .
3,660,545 5/1972 Wichterle ............................ 264/1.4
3,790,336 2/1974 Brede et al. ......................... 432/125

FOREIGN PATENT DOCUMENTS

159359 4/1974 Czechoslovakia .

Primary Examiner—Jay H. Woo
Assistant Examiner—Mike McGurk
Attorney, Agent, or Firm—Vincent P. Pirri

[57] ABSTRACT

A centrifugal casting device and method employing a rotatable polymerization column adapted to accommodate a plurality of vertically aligned molds and being associated with an arrangement of advancing means and mold feeding means which are synchronized to intermittently and automatically advance a mold containing a polymerizable or curable composition in the mold cavity over the polymerization column and then automatically force feeding said mold into the polymerization column.

10 Claims, 7 Drawing Figures

DEVICE AND METHOD FOR CENTRIFUGALLY CASTING ARTICLES ON A CONTINUOUS BASIS

DESCRIPTION

1. Technical Field

The present invention relates to a device and method for centrifugally casting a plurality of axially symmetrical or asymmetrical articles such as lenses, disc valves, and the like on a continuous basis. In a more specific aspect, the present invention relates to a device and method which employs a rotatable polymerization column adapted to accommodate and restrain a number of vertically arranged molds within said polymerization column and having advancing means for intermittent positioning a mold containing a polymerizable or curable composition into alignment with inlet end of the polymerization column; displacement means for force feeding said advanced mold into the inlet end of the polymerization column; and control means for synchronizing the advancing means and displacement means such that after the advancing means positions the mold over the inlet end of the polymerization column, the displacement means automatically forces the mold into the polymerization column which causes the series aligned molds within the polymerization column to be displaced by a sufficient amount to eject the bottommost mold. The cycle of advancing followed by force feeding a mold into the polymerization column is repeated and sychronized so that the polymerizable or curable composition in the bottommost mold is at least substantially formed into a predetermined shaped article thereby providing a continuous operation for producing a plurality of symmetrical or asymmetrical spun cast articles.

2. Background Art

It is known that the polymerization casting of axially symmetrical articles, such as contact lenses, can be performed by using equipment in which individual molds are arranged in a carousel or in a vertical stack configuration. These individual molds, characterized by an outer cylindrical wall and a mold cavity with an exposed concave bottom surface and containing a liquid polymerizable mixture in the cavity, are caused to rotate about their vertical axis at a rotational speed (and under polymerization conditions) sufficient to create a centrifugal force which causes a radially outward displacement of the liquid reactants in the mold. By maintaining the rotating mold(s) under predetermined and known polymerization conditions, the outwardly displaced liquid reactants are caused to polymerize to a solid polymeric contact lens. The resulting lens is characterized by a convex optical surface which corresponds to the concave surface of the mold and a concave optical surface whose geometry has been created, to a significant degree, by the centrifugal force(s) employed during the polymerization cycle.

In the centrifugal casting of contact lenses on a commercial scale, it is preferred for the attainment of good yield to effect the polymerization or curable reaction under an inert gaseous medium such as argon or nitrogen. This is due to the fact that the oxygen component of air entrained within the polymerization column can inhibit the polymerization reaction and adversely affect the quality and acceptability of the contact lens product. The controlled feed of nitrogen through the polymerization column will purge any entrained air in the polymerization zone and provide an inert environment for conducting the polymerization process.

The aforesaid carousel arrangement is rather complex and quite large with respect to the size of the molds. It requires that each mold be individually rotated on its own separate vertical axis. It is reported that the carousel arrangement suffers from the disadvantages of requiring excess inert gas to eliminate the inhibiting effect of oxygen (in the air) present during the polymerization reaction. The use of excess inert gas during the polymerization of the monomeric reactants causes the entrainment of monomer in the form of vapors and the subsequent deposition and/or polymerization on the walls and equipment. Further information is set forth in U.S. Pat. No. 3,660,545, issued May 2, 1972, the full disclosure of which is incorporated by reference as if set out in full text.

In the vertical stack arrangement a rotatable polymerization tube having an internal circular cross-sectional geometry is adapted to receive at one end of the tube a plurality of circular molds which become seated to one another in the said tube, each mold containing the liquid polymerizable reactants in the mold cavity. In operation, the molds are gravity fed into the upper end of the polymerization tube and free-fall through the tube against an upwardly flowing inert gas, e.g., carbon dioxide, due to their own weight. The exit end of the tube is seated tightly on a revolving plate member which imparts the rotation to the tube and which plate has a centrally defined opening for discharging inert gas into the polymerization tube to contact the descending gravity fed molds. In this type of construction, the revolving plate member would have to be disconnected and displaced from the polymerization column to remove the molds. In addition, the feeding of the inert gas from the center of the revolving plate member into the polymerization column and onto the bottom surface of the bottommost mold could impede the rotation of this mold and thereby prevent the molds within the tube from being rotated at the same speed due to undesirable slippage between the molds and the inner wall of the polymerization column.

In a copending application Ser. No. 491,159 filed on May 4, 1983 by the same assignee of the subject application, an improvement in the above described rotatable polymerization tube and free falling mold arrangement is disclosed. Specifically, at the end position of the polymerization tube restraining means are employed to improve the synchronization of the rotation of the molds with the rotation of the tube.

In a copending application Ser. No. 490,634 filed on May 2, 1983 by the same assignee of the subject application, an improvement in the above described devices employing a rotatable polymerization tube adapted to accommodate a plurality of vertically arranged molds is disclosed. Specifically, a device is disclosed for centrifugally casting of articles which comprises a rotatable polymerization tube adapted for rotation about a vertical axis and adapted for receiving in vertical series a plurality of molds containing a polymerizable or curable composition; securing means for securing a plurality of molds in vertical series in an interference fitting and sliding relationship within said tube, said securing means being adapted to concentrically dispose said molds to the vertical axis of said polymerization tube; gas flow means associated with the inner surface of said tube and the outer wall of said molds to accommodate a flow of a gaseous medium through said polymerization tube; and said device being operable such that the rotation of said tube causes the synchronized rotation of said molds while maintaining the concentricity of said molds to the axis of said polymerization tube until at least the polymerizable or curable composition in each mold is spin cast into a predetermined shaped article.

The securing means which secure the molds within the polymerization tube can be at least two spaced apart longitudinal projections on the inner surface of the polymerization tube or on the outer wall of the molds forming an interference fit therebetween. The projections on the tube or mold could form an integral part of the tube or mold and be made of the same material or the projections could be a separate component secured to the inner surface of the tube or the outer wall of the mold in a conventional manner using an adhesive or the like. The material constituting the projection can be hard or resilient as long as the molds and inner wall of the tube cooperate to provide an interference fit therebetween.

Both of the disclosures made in the above copending applications Ser. Nos. 491,159 and 490,634 are incorporated by reference herein as if such disclosure was set out in full text.

OBJECTS OF THE INVENTION

Accordingly, one or more objects will be achieved by the practice of the invention.

Objects of the present invention are to provide novel mold advancing means cooperatively associated with mold feeding means for use with devices such as described in the above disclosures, copending U.S. applications Ser. Nos. 491,159 and 490,634, which employ a polymerization tube adapted to accommodate and restrain a plurality of vertically arranged molds within said polymerization tube.

It is another object of the present invention to provide a device and method for centrifugically casting quality reproducible symmetrical or asymmetrical articles, such as lenses, on a continuous basis.

It is another object of the present invention to provide a centrifugal casting device and method employing a novel arrangement of mold advancing means and mold feeding means which are synchronized on a repeating cycle to intermittently advance a mold containing a polymerizable or curable composition over the inlet end of a polymerization column containing a plurality of molds restrained within said column and then automatically force feeding said advanced mold into said polymerization column where it displaces the plurality of molds an amount sufficient to eject the bottommost mold from the polymerization column thereby providing a continuous operation for producing spin cast articles.

DISCLOSURE OF THE INVENTION

The invention relates to a device for centrifugally casting symmetrical or asymmetrical articles comprising a rotatable polymerization column adapted for accommodating and restraining a plurality of molds within said polymerization column; advancing means for intermittently positioning a mold containing a polymerizable or curable composition into alignment with the inlet end of said polymerization column; displacement means for intermittently force feeding said advanced mold into said inlet end of said polymerization column; and control means for synchronizing and repeating the cycle of said advancing means followed by said displacement means such that after said mold is positioned over said inlet end of said polymerization column, said mold is automatically forced into the polymerization column thereby causing said series aligned molds therein to be displaced by a sufficient amount so as to eject the bottommost mold from the outlet end of said polymerization column and the time interval between said cycle being sufficient so that said polymerizable or curable composition in said bottom most mold is at least substantially formed into a predetermined shaped article.

The invention also relates to a method for centrifugally casting of shaped articles on a continuous basis comprising the steps:

(a) rotating a polymerization column about its longitudinal axis to provide a polymerization zone, said polymerization column being adapted for receiving a plurality of molds in vertical series, and restraining means associated with said polymerization column and said molds for maintaining said plurality of molds within said polymerization column;

(b) intermittently force feeding a series of said molds one at a time into the inlet end of said polymerization column, said molds containing a polymerizable or curable composition and each of said force fed molds causing a displacement of the series of said molds within said polymerization column by an amount sufficient to eject the bottommost mold out through the outlet end of said polymerization column and the time interval between the advancing and force feeding cycle of successive molds being sufficient so that the rotation of said polymerization column causes and/or maintains the radially outward displacement of said polymerizable or curable composition in the cavity of each of said molds within the polymerization zone to assume a predetermined liquid configuration and being sufficient so that said bottom most mold has its polymerizable or curable composition at least substantially formed into a predetermined shaped article; and (c) collecting said intermittent ejected molds containing the predetermined shaped article.

Desirably, the device can have gas feed means for directing a gaseous medium through the rotating column containing the rotating molds. It is preferred that in the spin casting of soft contact lenses, the gaseous medium be an inert gas of argon or nitrogen. This is due to the fact that undesirable air entrained within the column during polymerization will inhibit the polymerization process and could result in a product of unacceptable quality. A feed or inert gas, such as nitrogen, through the polymerization column will purge any entrained air and provide an inert environment for the polymerization process to occur.

The novel gas feed means disclosed in copending application Ser. No. 490,026 filed on May 2, 1983 by the same assignee of the subject application can be used. The disclosure made in this application, to the extent intended herein, is incorporated herein by reference as if set out in full text.

It is to be understood that the term "polymerization column" (tube) as used herein includes a tube at least a portion of which includes a polymerization zone as well as a conditioning zone, or a tube which includes a conditioning zone associated with or coaxially mounted to a tube which includes a polymerization zone and a conditioning zone from a source not associated therewith, and similar arrangements. The conditioning tube (zone) preferably can be be rotated at the same speed as the polymerization tube (zone). A primary benefit in the use of a conditioning tube in conjunction with a polymerization tube is that the centrifugal forces generated by the rotation of the tubes cause the radially outward displaced liquid polymerizable or curable composition in the mold cavity to assume or maintain the desired shape of the article to be formed prior to being polymerized in the polymerization tube.

By way of illustration, when using a circular mold, the hollow cross sectional area of the tube can assume any regular or irregular polygonal shape as for example, circular, square, rectangular, triangular and the like. When the cross sectional area of the tube is circular, the molds can represent a circle interrupted by a plurality of ridges or projections to insure an interference fit within the wall of the tube. A primary requirement for the polymerization column and the molds is that they cooperate to provide restraining means therebetween to secure a vertically aligned series of molds within the column so as to prevent the molds from exiting the outlet end of the column by the force of gravity. Accordingly, the molds will be ejected from the column only under a positive force imparted through the force feeding of the molds into the column.

The control means of this invention can be of the conventional type such as a step wheel, timer, cam arrangement, and the like, as long as it synchronizes the activation of the advancing means followed by activation of the displacement means and repeats this cycle after a sufficient time period to cause the polymerization process to be at least substantially completed for the reactant composition in the bottommost mold. In the initial set up of the device of this invention, it would be advisable to fill the polymerization column with dummy molds (molds that do not have any polymerizable or curable composition). Then the first mold force fed into the filled up column would contain the polymerizable or curable composition and would intermittently descend through the polymerization column for a sufficient time period to have its polymerizable or curable composition at least substantially formed into a predetermined shaped article.

By the practice of the inventions contemplated herein, there can be produced precision articles of predetermined and exacting details and dimensions. e.g., small medical devices such as heart valves and diaphragms; contact lenses, and the like. Such articles, depending on the ultimate use, can be hard, flexible, or soft and can be hydrophilic or hydrophobic. In particular, the novel device and novel process can be utilized in the manufacture of a wide variety of contact lenses which can be symmetrical or asymmetrical and further characterized as hard, flexible or soft, water-absorptive or non-water-absorptive.

Any fluid polymerizable, curable or moldable reactant or mixture with/without an inert or reactive solvent which is/are capable of being displaced outwardly due to the rotation of the column, i.e., by the resultant centrifugal forces, can be employed in the practice of the invention. The medium comprising the reactant(s) constitute a homogenous liquid and is capable of forming a desired shaped article during the centrifugal casting operation. The article may be opaque, translucent or transparent depending onto the ultimate use of the cast article formed. For instance, it is not generally a necessity that diaphragms and artificial heart valve substitutes obtained by the practice of the invention be colorless and transparent. On the other hand, for example, it is a requirement that soft hydrophilic contact lenses be fully transparent, of good optical quality, soft and resilient as well as possessing other necessary and desirable characteristics.

In particular, a centrifugal casting device coupled to the novel mold advancing and displacement means of this invention can be utilized in the manufacture of a wide variety of contact lenses which can be symmetrical or asymmetrical; hard, flexible or soft; water absorptive or non-water absorptive; low, medium, or high oxygen permeability or transportability; and the like. By choosing suitably designed mold cavities or bottoms there can be obtained a wide variety of modified lens shapes, e.g., toric, bifocal, truncated and/or ballasted contact lenses. A wide variety of materials or construction can be employed to fabricate the molds; see, for example, U.S. Pat. No. 3,660,545. For the preparation of hydrophilic articles such as soft contact lenses a mold fabricated of polypropylene is suitable. To insure proper wetting of the optical surface of the mold by the lens-forming mixture it is desirable to first pretreat or hydrophilize the said surface by known methods.

The liquid lens-forming mixture can comprise monomer, prepolymer or vulcanizable components. Particular suitable components are hydrophilic monomers preferably including those which form slightly or moderately crosslinked, three dimensional networks such as those disclosed in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate,, diethylene glycol monomethacrylate, diethylene glycol monoacrylate, propylene glycol monomethylate,, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; the alkyl substituted N-vinyl pyrrolidones, e.g., methyl substituted N-vinylpyrrolidone; glycidyl methacrylate; glycidyl acrylate; the unsaturated amines; the alkyl ethyl acrylates; solubilized collagen; mixtures thereof; and others known to the art.

Hydrophilic monomers particularly useful in the practice of the invention to manufacture contact lenses include hydrophobic acrylic esters, suitably lower alkyl acrylic esters, preferably wherein the alkyl moiety contains 1–5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or mixtures thereof.

Other suitable monomers include the ethylenically unsaturated monocarboxylic acid esters, in particular, the methacrylic and acrylic acid esters of siloxane monomers and polymers with/without a pendant hydroxyl group. These monomers are well documented in the contact lens art; see, for example, U.S. Pat. Nos. 4,139,548; 4,235,985; 4,152,508; 3,808,178; 4,139,692; 4,248,989; and 4,139,513. The disclosure of the foregoing illustrative patents, to the extent intended herein, are incorporated by reference as if set out in full text.

Among the preferred monomeric mixtures are those which contain at least one alkylene glycol monoester of methacrylic acid, especially ethylene glycol monomethacrylate, and at least one crosslinking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, glycidyl methacrylate, N-methylacrylamide, diethylene glycol monomethacrylate, and others illustrated above.

The above illustrated monomers, monomeric mixtures including mixtures of hydrophobic and hydrophilic reactants, may be further admixed with a minor proportion or di- or polyfunctional polymerizable species to cause crosslinking of the polymeric matrix as polymerization or curing proceeds. Examples of such di- or polyfunctional species include: divinylbenzene,, ethylene glycol diacrylate or methacrylate, propylene glycol diacrylate or methacrylate, and the acrylate or methacrylate esters of the following polyols: triethanolamine, glycerol, pentaerythritol, butylene glycol, diethylene glycol, triethylene glycol, tetraethylene glycol, mannitol, sorbitol and the like. Other crosslinking monomers can be illustrated by N,N-methylene-bis-acrylamide or methacrylamide, sulfonated divinylbenzene, and divinylsulfone.

Additional lens-forming materials which are suitable in the fabrication of contact lenses are illustrated by one or more of the following U.S. Pat. Nos. 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524, 3,700,761; 3,721,657; 3,758,448; 3,772,235; 3,786,034; 3,803,093; 3,816,571; 3,940,207; 3,431,046; 3,542,461; 4,055,378; 4,064,086; and 4,062,627.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc.; and mixtures thereof. In general, the solvent comprises a minor amount of the reaction medium, i.e., less than about 50 weight percent.

Polymerization of the lens-forming mixture may be carried out with free radical catalysts and/or initiators of the type in common use in vinyl polymerization. Such catalysts species can include the organic peroxides, the alkyl percarbonates, hydrogen peroxides, and inorganic materials such as ammonium, sodium, or potassium persulfate. Polymerization temperatures can vary from about 20° C., and lower, to about 100° C., and higher.

Polymerization of the monomer or prepolymer material can also be effected using, for example, radiation (U.V., X-ray, microwave, or other well-known forms of radiation) with/without the presence of well-known initiator(s) and/or catalyst(s).

When using radiation as the catalyst in the polymerization process, the polymerization column (tube) has to be fabricated from a material that will not impede the transmission of the radiation into the polymerization zone of the column. Glass, such as Pyrex, would be a suitable material for the polymerization column when using radiation as the catalyst. When using other types of catalysts as recited above, the polymerization column could be fabricated from various types of metals such as steel, bronze and the like.

In the fabrication of contact lenses, the lens-forming material is placed in the mold cavity having an optical concave surface wetted by said material, and then intermittently and forced fed, one at a time, into the inlet end of a rotating polymerization column which desirably comprises a "conditioning" zone near the inlet end and a polymerization reaction zone toward the outlet end. It is preferred that the molds be characterized by a pretreated optical surface to increase its hydrophilicity or wettability in a manner well-known in the art. The speed of rotation of the tube and the molds, when secured in interference fitting relationship, is adjusted to cause and/or maintain radially outward displacement of the lens-forming mixture to a predetermined lens configuration which when subjected to the polymerization conditions employed in the tube will form the desired shaped contact lens. Rotational speed of, for example, 300 r.p.m., and lower to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of catalyst, initiator, and/or radiation energy source, and factors discussed previously and readily apparent to the artisan.

BRIEF DESCRIPTION OF DRAWING

The present invention will become more apparent from the following description thereof when considered together with the accompanying drawing which is set forth as being exemplary or embodiments of the present invention and is not intended in any way to be limited thereof and wherein.

DETAILED DESCRIPTION OF DRAWING

Figures 1, 2:
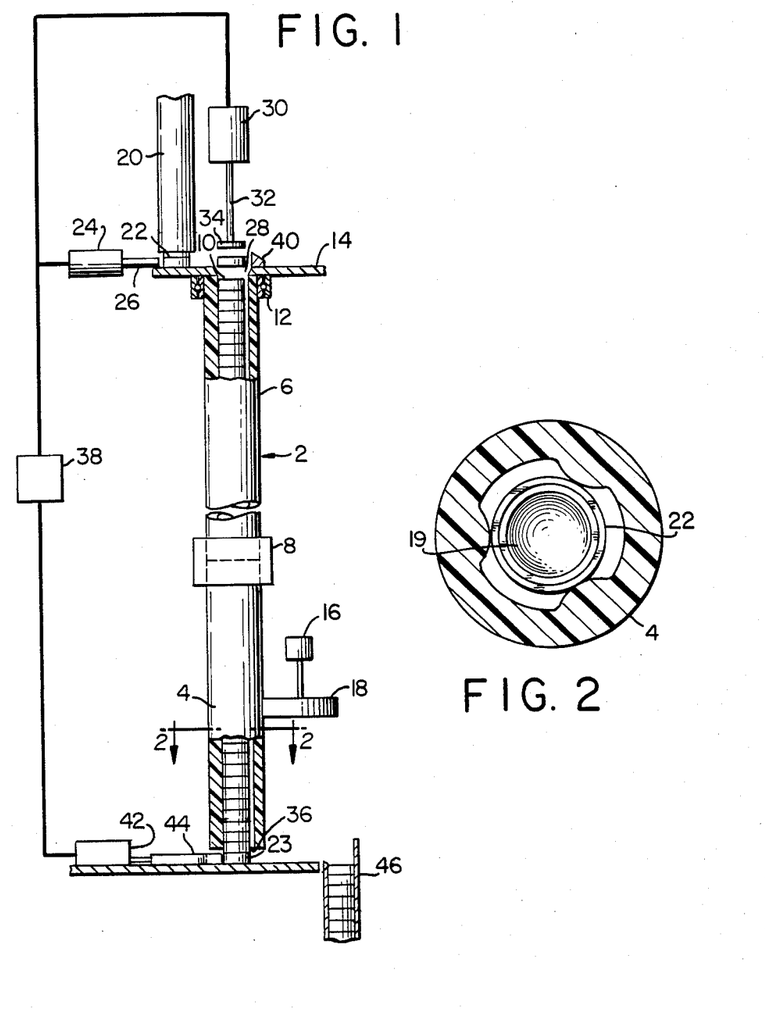
FIG. 1 is a semi-schematic side elevation view, partly is cross-sectional, of a device of this invention for producing spin cast articles on a continuous basis.
FIG. 2 is a cross-sectional view taken through line 2—2 of FIG. 1.

Referring in detail to FIG. 1, there is shown a rotatable polymerization column 2 comprising a polymerization tube 4 having a conditioning tube 6 coaxially mounted above polymerization tube 4 and coupled together using a conventional bearing 8. To maintain polymerization column 2 in a vertical position, the inlet end 10 is mounted in a conventional bearing 12 which in turn is secured to support member 14. A conventional motor 16 drives wheel 18 which in turn rotates polymerization column 2 at a desired speed required for the polymerization process to occur.

Disposed above support member 14 is mold magazine 20 containing a plurality of molds 22 each of which contain a metered amount of a polymerizable or curable composition 19 as shown in FIG. 2.

Magazine 20 can also be a rotatable column which causes and/or maintains prewetting of the surface of the mold cavity. Desirably magazine 20 is disposed in relationship to support member 14 such that the vertical distance between the outlet end of magazine 20 and support member 14 is slightly larger than the mold thickness.

A positive drive advancing means 24, conventionally operated by hydraulic, pneumatic or similar means, rests on support surface 14 and is disposed such that its pusher arm 26 is juxaposed mold 22 which has been ejected from magazine 20. Support members 14 defines a slightly tapered opening 28 over the inlet end 10 of polymerization column 2, said defined opening 28 having a horizontal cross sectional area equal to or larger than the horizontal cross sectional area of mold 22. Disposed above opening 28 and inlet end 10 is a positive displacement drive means 30, conventionally operated by hydraulic, pneumatic or similar means, having a pusher arm 32. Pusher arm 32 terminates in a cylindrical configuration 34 having a horizontal cross sectional area substantially equal to the horizontal cross sectional area of molds 22 so that when extended, pusher arm 32 will impart an even and uniform force on mold 22 and force feed said mold 22 into polymerization column 2. Since polymerization column 2 will generally be rotating it is preferable to have pusher arm 32 mounted on conventional ball bearing means (not shown) so that it can freely rotate when feeding a mold 22 into rotating polymerization column 2.

Referring to FIG. 2, mold 22 is shown disposed within polymerization tube 4 in an interference fit relationship. This restrains mold 22 from free falling through polymerization tube 4 out through outlet end 36. In the operational mode, control means 38 (such as a step wheel, timer, cam arrangement or the like) synchronizes the activation of driver means 24 and driver means 30 in a repeatable cycle such that pusher arm 26 is first advanced to contact and push a dosed mold 22 along support member 14 into an open opening 28. To facilitate the positioning of mold 22 a stop member 40 is provided to prevent mold 22 from being pushed beyond opening 28. With mold 22 in position, driver means 30 is automatically activated to force mold 22 into the inlet end of polymerization column 2 where it advances the aligned molds within column 2 by an amount equal to the height of mold 22 thereby ejecting a mold 23 from the outlet end 36 of polymerization tube 4. The control means are set such that the time between cycles of advancing mold 22 over opening 28 and forcing it into polymerization column 2 is sufficient to permit the polymerizable or curable composition in the bottommost mold to substantially form into a predetermined shaped article.

Conventional discharge driver means 42 is disposed adjacent to the outlet end 36 or polymerization tube 4 such that its pusher arm 44 can advance ejected mold 23 containing the formed article into container 46 for collection. Driver means 42 could also be coupled into control means 38 and activated following the force feeding or mold 22 into polymerization column 2 which causes mold 23 to be ejected. This will provide a complete automated device for producing spin cast articles, such as soft contact lenses, on a continuous basis.

In an alternate embodiment, the driver means 42 could be replaced by a conventional moving conveyor belt which would receive the ejected molds and advance them to a collection station where they could be fed into a container such as 46 shown in FIG. 1. In another alternate embodiment, conventional sensing means such as photo electric tubes, mechanical switches and the like, can be arranged about opening 28 so as to provide a signal to activate driver means 30 when a mold is placed in alignment over opening 28.

Figure 3:
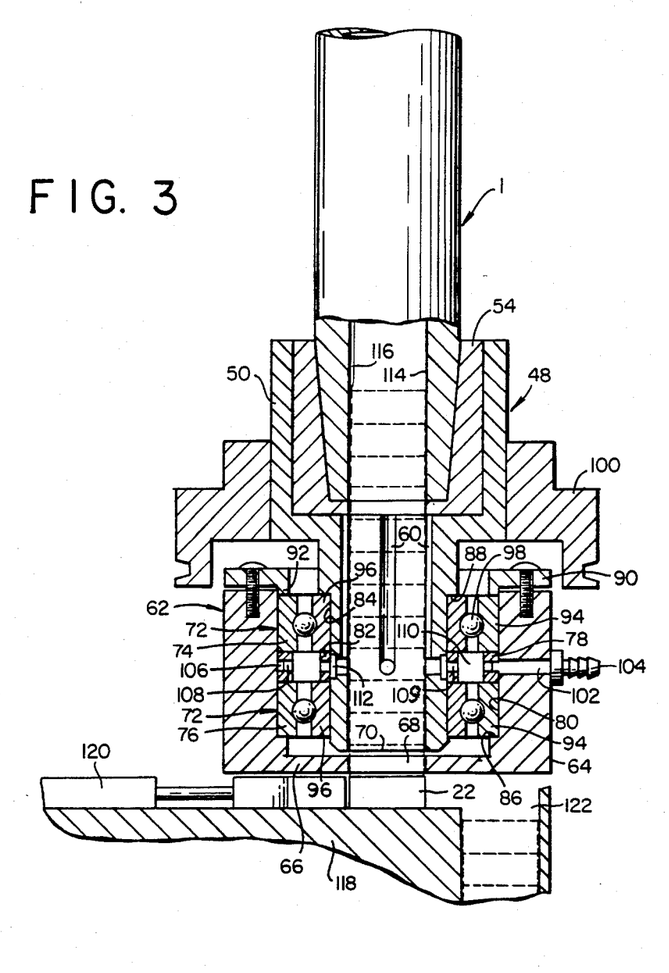
FIG. 3 is a side elevational view partly in cross section of a gas feed means suitable for use in this invention.
Figure 4:
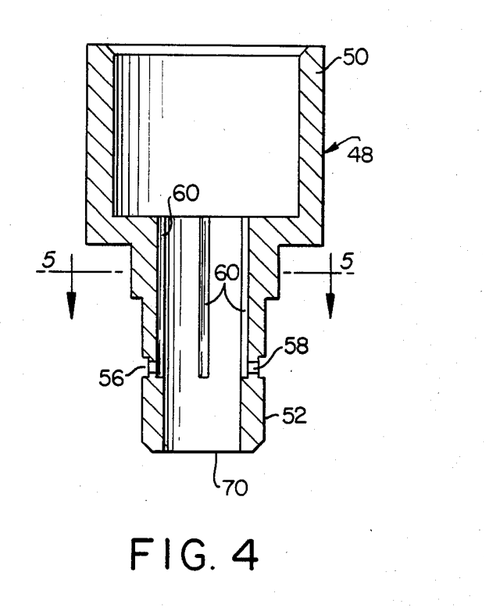
FIG. 4 is a side elevational view in cross section of the rotatable sleeve member shown in FIG. 3.
Figure 5:
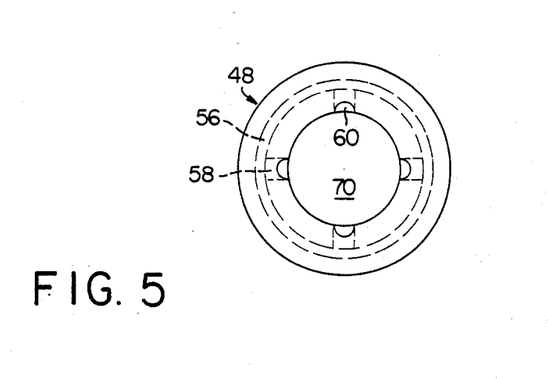
FIG. 5 is a view taken along the lines 5—5 of FIG. 4.

Referring in detail to FIGS. 3 to 5 there is shown a gas feed means suitable for use in conjunction with the novel device and method of this invention, said gas feed means being described in copending application Ser. No. 490,626 filed on May 2, 1983 now U.S. Pat. No. 4,468,184 and discussed above. Specifically, the gas feed means includes a rotatable sleeve member 48 having an upper tubular section 50 and a lower tubular section 52. As will be seen, the upper tubular section 50 has a larger cross-sectional area than polymerization column 1 and the lower tubular section 52. Disposed within the upper tubular section 50 is a resilient liner material 54, preferably plastic, that is slightly tapered and adapted for receiving the lower end of polymerization column 1 is frictional securement therein. As shown, the lower end of polymerization column 1 is slightly tapered to permit easy insertion and securement of polymerization tube 1 within liner 54. Although liner 54 is preferably made of plastic, it can be made of any resilient material that would be suitable for securing the lower end of the polymerization column 1 in frictional securement within said liner 54 so that rotation of sleeve member 48 will empart synchronized rotation to polymerization column 1. As shown in FIG. 3, the inner diameter of polymerization column 1 is substantially equal to the inner diameter of lower tubular section 52 of sleeve 48 and axially aligned therewith so that molds 22 (shown in outline form in FIG. 3 and shown in a plan view in FIG. 2) exiting from polymerization column 1 will be fed into and descend through lower tubular section 52 of sleeve 48.

As shown in FIGS. 3, 4 or 5, a circumferential groove 56 is formed in the outer wall surface of lower tubular section 52 and a plurality of gas inlet openings 58 are circumferentially disposed through and defined by the base of groove 56. A plurality of longitudinal grooves 60 are formed in the inner wall of lower tubular section 52 with each groove 60 extending from a communicating gas inlet opening 58 up through the top of lower tubular section 52. Thus any gas entering inlet opening 58 when molds 22 are disposed within lower tubular section 52 will be directed up through grooves 60 and into the interior of polymerization column 1.

Referring to FIG. 3, lower tubular section 52 or sleeve 48 is disposed within a cylindrical cupped support member 62 having an upstanding cylindrical wall 64 and a base 66 defining an opening 68 which is axially aligned with the opening 70 of lower tubular section 52. Disposed between the upstanding cylindrical wall 64 and lower tubular section 52 is a cylindrical pre-loaded bearing pair 72 including an upper bearing 74 and a lower bearing 76. Separating the bearing pair 72 and supporting upper bearing 74 is an outer support ring 78 disposed adjacent the internal wall 80 of support member 62, and an inner support ring 82 disposed adjacent the outer wall 84 of lower tubular section 52. In assembling the unit, the lower bearing 76 is placed into the cylindrical cupped support member 62 such that its lower surface rests on flange 86. Outer support ring 78 and inner support ring 82 are then disposed on top of lower bearing 76 whereupon upper bearing 74 can then be mounted on top of outer support ring 78 and inner support ring 82. When rotatable sleeve member 48 is inserted within support 62, circular flange 88 disposed on the outer wall of lower tubular section 52 secures the upper bearing 74 in place. A securing ring 90 having an L-shaped cross section is detachably secured to the top of support member 62 by any suitable means such as the threaded elements shown, with its internal flange member 92 securing the upper bearing 74 in proper alignment within support member 62. Each of the bearings 74 and 76 includes an outer fixed race 94 and an inner rotatable race 96 which are spaced apart by conventional ball bearings 98. By this arrangement, sleeve member 48 can be rotated within support member 62 by conventional fly wheel means illustrated generally as 100 and which is operatively associated with a conventional motor driven belt means not shown.

Figure 6:
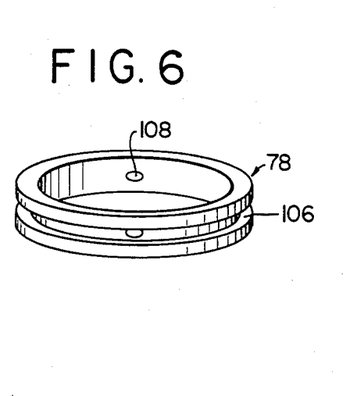
FIG. 6 is a perspective view of the outer support ring member for the bearing pair shown in the gas feed means of FIG. 3.
Figure 7:
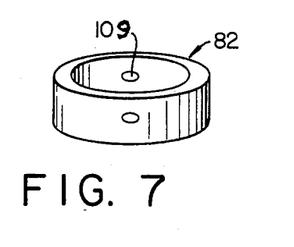
FIG. 7 is a perspective view of the inner support ring member for the bearing pair shown in the gas feed means of FIG. 3.

Support member 62 is provided with an opening 102 defined in its side wall into which is secured a hose bar 104 which is adapted to be connected to a gaseous supply means not shown. In FIG. 6 outer support ring 78 is provided with an annual groove 106 disposed in its outer wall. A plurality of openings 108 are circumferentially disposed in the base of groove 106 and extends through its upstanding wall. As shown in FIG. 7, inner support ring 82 defines a plurality of openings 109 extending through its upstanding wall. Referring again to FIG. 3, it will be seen that the spaced apart pre-loaded bearing pair 72 and the spaced apart outer support ring 78 and inner support ring 82 define an annular zone 110.

In the operational mode and with reference to FIGS. 3 to 7, a gaseous medium fed through opening 102 travels along and within circumferential groove 106 and is directed through openings 108 and into annular zone 110. The gaseous medium is then directed through openings 109 in inner support ring 82, into and through openings 58 of lower tubular section 52 and up grooves 60 into the interior of polymerization column 1. The height of inner support ring 82 is greater than the width of circumferential groove 56 in tubular section 52 so that when inner support ring 82 is positioned adjacent groove 56, a circumferential zone 112 is defined that can accommodate a gaseous medium fed through openings 109 of inner support ring 82. This will allow a uniform gas flow to be fed through gas inlet openings 58 and up through grooves 60 into the polymerization column 1.

In the operational mode, mold 22 containing a polymerizable or curable compound in its cavity is forceably ejected from the polymerization column 1 into tubular section 52 and with the diameter of the molds substantially equal to the cross-sectional diameter of tubular section 52, the molds 22 will effectively prevent any gaseous medium fed through openings 58 from escaping out opening 70 of tubular section 52. Thus the gaseous inert medium will flow up through grooves 60 into the interior of polymerization column 1 between the peripheral wall of molds 22 and the inner surface of polymerization column 1. If desired, the inner wall 114 of polymerization column 1 could have an longitudinal projection 116 as generally described in copending application Ser. No. 490,026 tiled on May 2, 1983 as described above. The inert gas fed up through polymerization column 1 will purge any entrained, undesirable gas such as oxygen in polymerization column 1 which could effect the quality and acceptability of the articles being casted. As shown in FIG. 3, an ejected mold 22 exited through opening 70 of the gas feed means will be supported on member 118 whereupon a conventional pusher means 120 will advance the ejected mold 22 to a receptacle 122 as discussed in conjunction with FIG. 1.

The pre-load bearing pair 72, desirably incorporates seals of a conventional type which would provide a retention of lubricants for the bearings. These seals would serve to define the circumferential zone 110 and effectively prevent the escape of any gas to areas other than through the plurality of openings 58 in tubular section 52 of sleeve 48.

EXAMPLE 1

The apparatus generally depicted in FIGS. 1 and 2 along with gas feed means can be used to prepare lenses. Specifically, polypropylene molds (FIG. 2) having a concave spherical optical surface in the mold cavity can be used in the centrifugal casting of contact lens. The mold dimensions can be: outside diameter—17 mm; inner diameter above mold cavity—15.6 mm; height or mold —7.5 mm; diameter of mold cavity—13.2 mm; central mold cavity radius—7.7 mm; depth or mold cavity (max)—3.3 mm; width of circular horizontal mold shoulder (located between the inner mold wall and mold cavity)—1.2 mm. The hydrophilicity or wettability of the optical surface or the molds can be enhanced by treatment in an oxygen, low temperature, plasma chamber for approximately 18 seconds, 50 watts gauge setting (Model LTA-302, Low Temperature Asher, LFE Corporation, Waltham, Mass. To a series of these molds, there can be charged, individually, a metered amount of the lens-forming mixture, i.e., approximately 20 milligrams. The lens-forming mixture (based on total weight) could comprise the following recipe:

| Components (Parts by Wt.) | |
| --- | --- |
| 2-Hydroxyethyl Methacrylate: | 84.6 |
| Ethylene Glycol Dimethacrylate: | 1.0 |
| Benzoin Methyl Ether (initiator): | 0.2 |
| Glycerol: | 14.2 |

The molds can be transported laterally by positive force means as shown in FIG. 1, to the inlet end of a rotating Pyrex column which is supported in an upright position by support means. Said Pyrex column being generally as shown in FIG. 1 as polymerization column 2. The molds can be force fed downwardly, one at a time, into the vertical column by pusher or plunger means having a circular nose which engages the mold at the mold shoulder. When the rotating column is filled with molds (capacity can vary, for instance, from 60 to 120 molds), the force feeding of each mold at the inlet end and the removal or ejection of the bottommost mold (containing the shaped lens product) at the outlet end can be synchronized or automated to effect a continuous process. The speed of rotation of the column about its vertical axis can be about 400 r.p.m. and total residence time or each mold in the column can be about 20 minutes. The rotating column can be maintained at ambient room temperature, i.e., about 20°-22° C. with nitrogen continually flowing upward in grooves 60 (see FIGS. 3 to 5 into the polymerization column 2 to remove any entrained oxygen in the column. In the so-called "conditioning" zone in the upper portion of the column, centrifugal forces created by the column rotation will cause the radially outward displacement of the liquid lens-forming mixture in the spherical mold cavity to be formed onto a predetermined lens shape. The "conditioning" of said liquid material should be maintained for a period of about 15 minutes in its downward decent in the conditioning zone to the polymerization zone. The polymerization zone of the column should likewise be maintained at ambient room temperature. The polymerization reaction can be conducted using UV radiation from a source outside the column (UV source: medium pressure, mercury arc, UV emission—300-400 nm, infrared is filtered, and lamp distance is 3 inches). The residence time in the polymerization zone should be about 5 minutes. A longer residence period can be employed, if desired, as well as subjecting the shaped contact lens blank still in the cavity of the mold to post-cure conditions. Immersion is distilled water causes the hydrophilic lens blank to swell which (swelling) causes the separation of the contact lens from the mold. Repeated washings in distilled water insures removal of catalyst or initiator residue and unreacted monomer(s). The contact lens should be finally immersed in physiologic solution (0.9% saline) until it reaches osmotic equilibrium with the solution.

The finished lens will generally have a refractive power (wet) of −6 diopters. It will be optically clear, transparent, inert to bacteria, biocompatable with the cornea, water content of about 39% by weight, dimensionally stable, and exhibits good mechanical properties. It is useful as a daily wear "soft" contact lens.

EXAMPLE 2

The procedure of Example 1 can be repeated using the following recipe:

| Components (Parts by Weight) | |
|---|---|
| 2-Hydroxyethyl Methacrylate: | 78 |
| Methacrylic Acid: | 2 |
| Isopropylpercarbonate: | 0.4 |
| Glycerol: | 19 |
| Ethylene Glycol Dimethacrylate: (No UV source) | 1.0 |

Polymerization Zone Conditions:
70° C.; residence time: 6 minutes.

This will produce a contact lens that is optically clear, transparent, inert to bacterial, biocompatible with living tissue, highly water-swellable, water-insoluble, dimensionally stable, and of good mechanical strength.

EXAMPLE 3

The procedure of Example 1 can be repeated using the following recipe:

| Components (Parts by Weight) | |
|---|---|
| 2-Hydroxyethyl Methacrylate: | 95 |
| Methyl Methacrylate: | 5 |
| Vazo$^R$ 33: | 0.2 |
| Propylene Glycol: | 10 |
| Ethylene Glycol Dimethacrylate: | 0.5 |

$^R$Registered Trademark of du Pont.

Polymerization Zone Conditions:
70° C.; reisdence time: 6 minutes.

This will produce a contact lens that is optically clear, transparent, inert to bacteria, biocompatible with living tissue, water-swellable, water-insoluble, dimensionally stable, and of good mechanical strength.

Modification of the mold cavity and of the recipe results in a wide variety of useful and suitable contact lenses as taught in U.S. Pat. No. 3,660,545, the full disclosure of which is incorporated by reference as if set out in full text.

We claim:

1. A device for centrifugally casting contact lenses comprising a rotatable polymerization column adapted for accommodating and restraining a plurality of molds within said polymerization column; advancing means for intermittently positioning a mold containing a polymerizable or curable composition into alignment with the inlet end of said polymerization column; displacement means for intermittently force feeding said advanced mold into said inlet end of said polymerization column; and control means for synchronizing and repeating the cycle of said advancing means followed by said displacement means such that after said mold is positioned in alignment with said inlet of said polymerization column, said mold is automatically forced into the polymerization column thereby causing said series aligned molds within said column to be displaced by a sufficient amount so as to eject the bottom most mold from the outlet end of said polymerization column, and the time interval between said cycles being sufficient so that said polymerizable or curable composition in said bottommost mold is at least substantially formed into a predetermined shaped article.

2. The device of claim 1 wherein said polymerization column comprises a polymerization tube coaxially mounted below a conditioning tube and secured so said polymerization tube and said conditioning tube are adapted to rotate at the same speed.

3. The device of claim 1 wherein said polymerization column is a polymerization tube.

4. The device of claim 1 wherein discharge means are associated with the outlet end of said polymerization tube for advancing ejected molds to a collection station.

5. The device of claim 4 wherein said control means activates the discharge mean to occur after the activation of the displacement means thereof providing a cycle in which the activation of said advancing means is followed by activation of said displacement means which in turn is followed by activation of said discharge means to provide a continuous operation for producing spin cast articles.

6. The device of claim 4 wherein said discharge means is a conveyor belt.

7. A method for centrifugally casting of shaped contact lenses on a continuous basis comprising the steps:
(a) rotating a polymerization column about its longitudinal axis to provide an elongated polymerization zone, said polymerization column being adapted for receiving a plurality of molds in vertical series, and restraining means associated with said polymerization column and said molds for maintaining said plurality of molds within said polymerization column;
(b) intermittently force feeding a series of said molds one at a time into the inlet end of said polymerization column, said molds containing a polymerizable or curable composition and each of said forced fed molds causing a displacement of the series of said molds with said polymerization column by an amount sufficient to eject the bottommost mold out the outlet end of said polymerization column and the time interval between the advancing and force feeding cycle of successive molds being sufficient so that the rotation of said polymerization column causes and/or maintains the radially outward displacement of said polymerization or curable composition in the cavity of each of said molds within said polymerization zone to assume a predetermine liquid configuration and being sufficient so that said bottom most mold being ejected out the outlet end of said polymerization column has its polymerizable or curable composition at least substantially formed into a predetermined shaped contact lenses; and (c) collecting said intermittent ejected molds containing the predetermined shaped contact lenses.

8. The method of claim 7 wherein in step (b) an inert gas is fed through said rotating polymerization column.

9. The method of claim 8 wherein in step (a) the moldable composition comprises a hydrophobic monomer-containing composition and in step (b) the inert gas is nitrogen.

10. The method of claim 9 wherein the contact lenses produced is a hydrophibic, water-swellable, water insoluble solid.

* * * * *